United States Patent

[11] 3,573,445

[72] Inventors Ludmila Alexandrovna Korytnaja
B. Kitaevskaja Str. 111/2, Apt 72;
Boris Nickoaevich Malinovsky, B.
Kitaevskaja Str. 111/2, Apt 16, Kiev,
U.S.S.R.

[21] Appl. No. 839,209
[22] Filed July 7, 1969
[45] Patented Apr. 6, 1971
Continuation-in-part of application Ser. No. 771,844, Oct. 30, 1968, now abandoned, Continuation-in-part of application Ser. No. 449,409, Apr. 20, 1965, now abandoned.

[54] DEVICE FOR PROGRAMMED CHECK OF DIGITAL COMPUTERS
4 Claims, 4 Drawing Figs.

[52] U.S. Cl. .......... 235/153, 340/166, 340/172.5
[51] Int. Cl. .......... G06f 11/04, G06f 11/06
[50] Field of Search .......... 235/153; 340/166, 172.5

[56] References Cited
UNITED STATES PATENTS

| | | | |
|---|---|---|---|
| 3,077,579 | 2/1963 | Greene et al. ........ | 340/172.5 |
| 3,213,428 | 10/1965 | Bianchi et al. ........ | 340/172.5 |

*Primary Examiner*—Malcolm A. Morrison
*Assistant Examiner*—R. Stephen Dildine, Jr.
*Attorney*—Waters, Roditi, Schwarts & Nissen

ABSTRACT: A programmed device for detecting faults in digital computers comprises an interrogation matrix ensuring activation of computer elements checked, an operating signal registration matrix that registers the operating signals arriving from the computer elements checked after their being activated by the interrogation matrix, a noise signal registration matrix, a unit for controlling said matrices, a switching board maintaining the connection between inputs of the computer elements checked and outputs of said interrogation matrix, and between outputs of the elements checked with inputs of said operating signal registration matrix and noise signal registration matrix.

DEVICE FOR PROGRAMMED CHECK OF DIGITAL COMPUTERS

This application is a continuation-in-part of application Ser. No. 771,844, filed Oct. 30, 1968 and now abandoned, the said application, in its turn, being a continuation-in-part of application Ser. No. 449,407, filed Apr. 20, 1965 and now abandoned.

The present invention relates to devices for automatic check of digital computers, and more particularly to devices of programmed automatic troubleshooting for indicating the number of a faulty module or element of a computer.

Usually for checking digital computers testing and diagnostical programs have been resorted to, introduced into the computer memory, as well as automatic devices checking the computer operations with the redundant check digits. These devices allow to test the correctness of the information transfer among the computer units and to test the computer in operation.

It is known that the above methods and devices do not provide exact detection of a faulty module or element in a computer. When using these devices, the operator closes a logic analysis chain to obtain information about the location of a faulty module or element of a computer.

Also known are devices for automatic test of computer units whose operation is compared with that of standard (reference) units. The known devices comprise a cycle counter, a comparison circuit, a counterdistributor and control registers. The unit checked is connected to inputs of the comparison circuit the other inputs of which are connected to the standard unit. The said devices have the disadvantage of not being universal, since each different type of computers requires its own system of standard units, its own checking methods and circuits.

Systems are known for testing a group of devices having two stable states and comprising means for simultaneous activation of said devices at finite intervals and generation of output pulses by each of these devices during normal operation; counting means having the same number of counting states as said devices; said counting means having a number of output lines, each corresponding to a definite counting state, the lines being assembled in the same sequence as the devices; individual unblocking means for each device, allowing transmission of available output pulses from a respective device having two stable states to said counting means from one corresponding output line, said counting means being changed over to the next counting state during said transmission of output pulses for generating an output signal in the next output line; a series of visual display elements, each being sensitive to one of said output signals for obtaining a sequential display when all said devices function normally, and showing a permanent image when one of said devices has developed a malfunction. Said systems are specialized and fail to ensure checking the operation of computer logic units; moreover, these systems are incapable of ensuring the checking of such computer units, the proper operation of which is disturbed when two-stable-state elements comprised in these units are activated simultaneously.

A computer logic element can be checked for correctness of operation by applying certain signals to its inputs and checking whether a response output signal is available. A computer logic unit can be checked for correctness by checking all its elements for correctness. A selective start of computer logic unit elements checked and a selective reception of their response signals must be ensured in this case. The conclusion on failsafety (or failure) of an element checked can be arrived at by measuring a response signal thereof. If the response signal arriving from the element checked has a value smaller than permissible (or is absent at all), this testifies that the element is faulty.

As is known the correctness of operation of computer units is affected by noise developed in them. Therefore, it is reasonable to measure values of noise signals together with measuring values of operating signals in order to secure the effective check. In measuring values of noise signals set up at the outputs of logic unit elements, a selective reception of these signals should also be provided.

It is an object of the present invention to provide a device for automatic detection of faults in digital computers, which ensures the simultaneous testing of elements in computer logic units, measurement of values of operating signals and noise signals in computer units checked, as well as indication of location of a faulty element in case of trouble detected.

According to the above and other objects the present invention resides in that the device for programmed check of digital computers incorporates: an interrogation matrix providing the selective starting of computer elements checked; an operating signal registration matrix intended for selective reception and measurements of values of response signals arriving from computer elements checked; a noise signal registration matrix intended for selective reception and measurement of values of noise signals arriving from computer elements checked; a switching board effecting the connection between inputs of computer elements checked and the outputs of said interrogation matrix, and between outputs of elements checked with the inputs of said operating signal registration matrix and noise signal registration matrix and; a unit for controlling said matrices, which ensures in-step operation of said matrices and computer elements checked.

It is expedient that the device matrices of interrogation, operating signal registration, and noise signal registration be fitted with logic coincidence elements, OR elements and amplifiers. The amplifiers of the operating signal registration matrix and of the noise signal registration matrix are preferably made as threshold ones. The operation threshold of the operating signal registration matrix amplifiers is to be equal to the optimal value of the voltage amplitude of response operating signals arriving from the computer elements checked. The operation threshold of the noise signal registration matrix amplifiers should equal the maximum permissible value of the voltage amplitude of noise signals arriving from the computer elements checked.

Other objects and advantages of the invention will become apparent from the description given hereinbelow, to be had in conjunction with the accompanying drawings, wherein.

Figure 1:
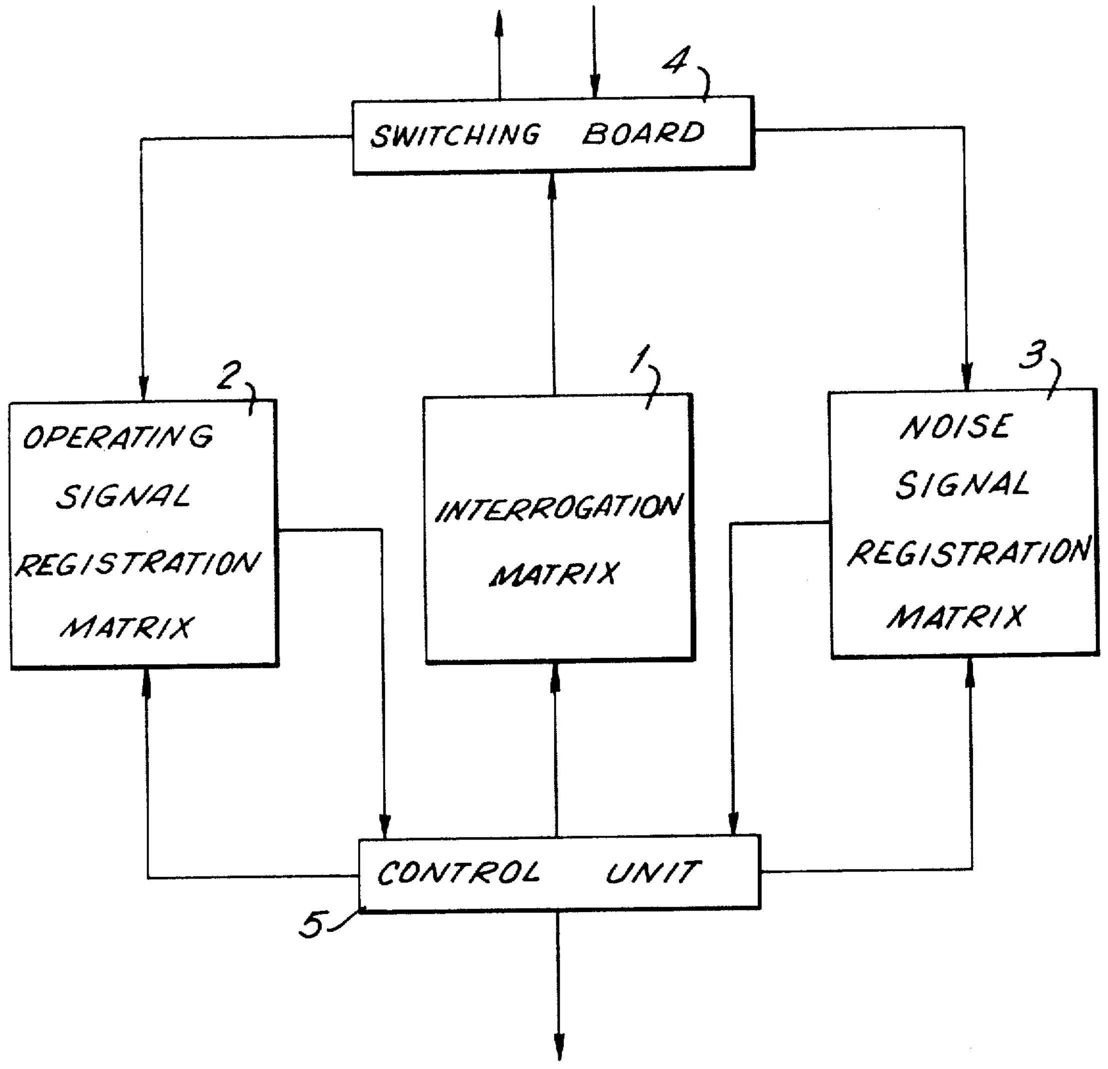
FIG. 1 shows a block diagram of the device according to the invention.
Figure 2:
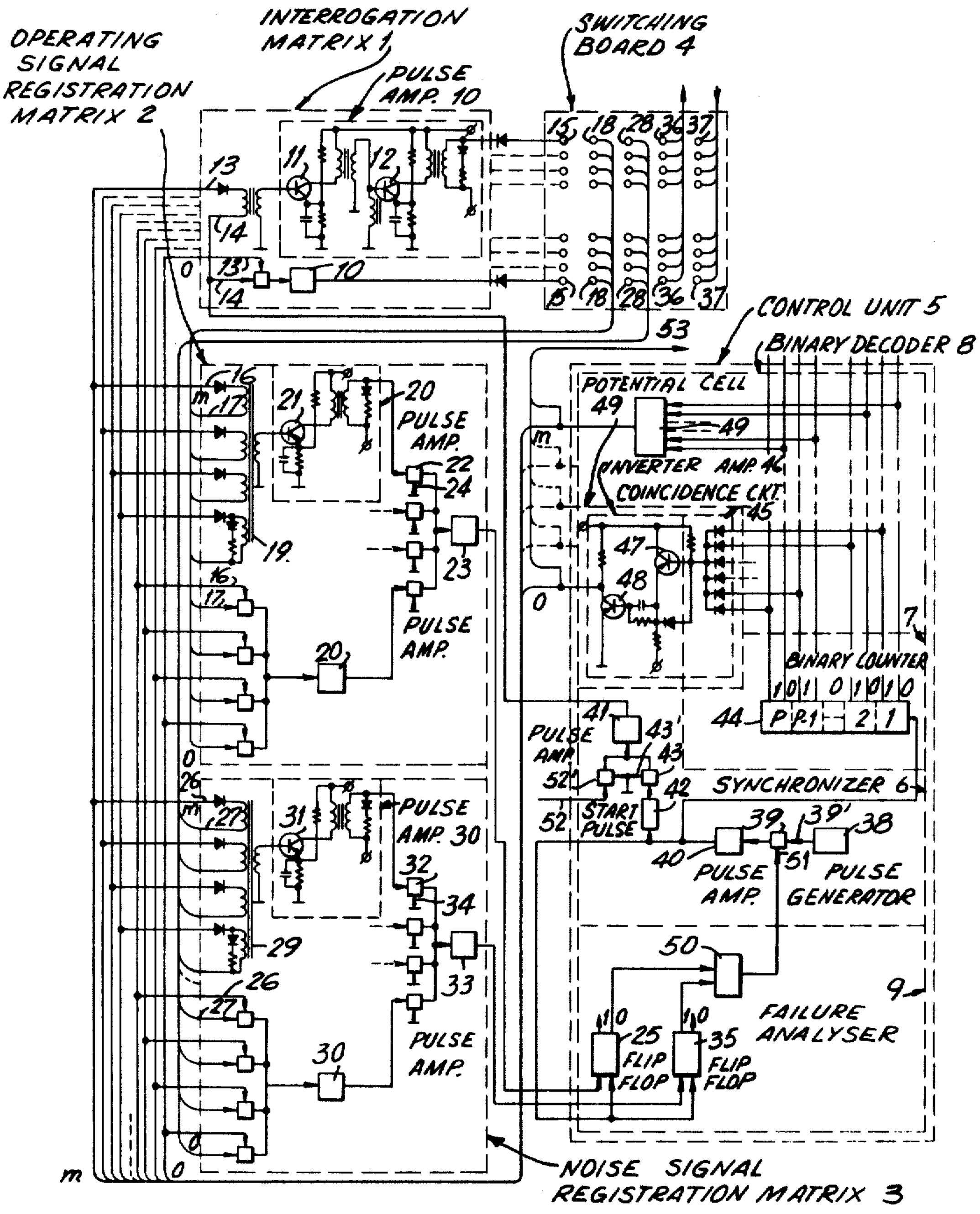
FIG. 2 shows a circuit diagram of the device according to the invention.

The device for programmed check of digital computers comprises interrogation matrix 1 (FIG. 1) having $m$ separate channels to activate computer elements to be checked; operating signal registration matrix 2 having $m$ independent channels for receiving response operating signals arriving from computer elements checked; noise signal registration matrix 3, having $m$ independent channels for receiving noise signals arriving from computer elements checked; switching board 4, connected to said matrices 1, 2 and 3 and to computer elements checked (not shown in the drawing), and unit 5 to control said matrices 1, 2 and 3. Control unit 5 comprises synchronizer 6 (FIG 2) connected with said interrogation matrix 1, $p$-digit binary counter 7 connected to said synchronizer 6, binary decoder 8 having $m$ outputs connected to said counter 7 and said matrices 1, 2 and 3, and failure analyzer 9 connected to said matrices 2 and 3 and said synchronizer 6.

Each channel of interrogation matrix 1 has pulse amplifier 10 using transistors 11, 12, and diode-transformer gate which is a logic coincidence element connected to the input of amplifier 10; input 13 of the gate is connected to a corresponding output of decoder 8, input 14 to synchronizer 6. Outputs of all amplifiers 10 of interrogation matrix 1 are connected to jacks 15 of switching board 4 by means of which they can be used separately or be combined in any sequence.

Figure 3:
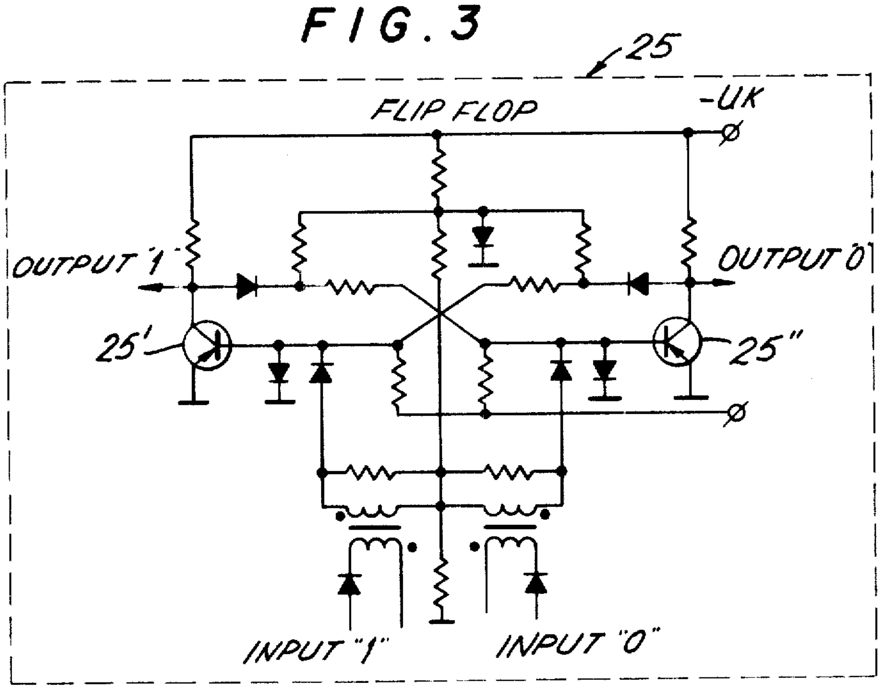
FIG. 3 shows a circuit diagram of the flip-flop used in the device according to the invention.

Each channel of operating signal registration matrix 2 comprises a diode-transformer gate which is a logic coincidence element. Input 16 of the gate in each channel is connected to a corresponding output of decoder 8, input 17 to corresponding jack 18 of switching board 4. The output of the gate, through a separation circuit having transformer 19, is coupled with the input of threshold pulse amplifier 20 using transistor 21. Diode-transformer gates of matrix 2 are connected to amplifiers 20 by groups of four gates in each. Amplifiers 20 have an operation threshold equaling the voltage amplitude optimum value of operating signals arriving from computer elements checked. The outputs of amplifiers 20, through gates 22 identical to the input diode-transformer gates of matrices 2, are connected to the input of amplifier 23 identical to amplifier 20. Gates 22 are unblocked all the time, since their inputs 24, identical to inputs 16, are grounded. The output of amplifier 23 is connected to the unit input of flip-flop 25 of failure analyzer 9. Flip-flop 25 uses transistors 25' and 25'' (FIG. 3). Input signals reach the flip-flop through diode-transformer gates identical to the gates of matrix 2. To the state 1 of flip-flop 25 there corresponds the presence of a potential which equals approximately zero at the unit output, and of a potential about $-U_k$ at the zero output.

Each channel of noise signal registration matrix 3 contains a diode-transformer gate which is a logic coincidence element. Input 26 of the gate in each channel is connected to a corresponding output of decoder 8, input 27 to a corresponding jack 28 of switching board 4. The output of the gate, through a separation circuit fitted with transformer 29, is connected to the input of threshold pulse amplifier 30 using transistor 31. The diode-transformer gates of matrix 3 are connected to amplifier 30 by groups of four gates in each. Amplifiers 30 have an operation threshold equaling the maximum permissible value of the voltage amplitude of noise signals arriving from the computer elements checked. The outputs of amplifiers 30, through gates 32 identical to the input diode-transformer gates of operating signal matrix 2, are connected to the input of amplifier 33 identical to amplifier 20 of matrix 2. Gates 32 are unblocked all the time, since their inputs 34, identical to inputs 16, are grounded. The output of amplifier 33 is connected to the unit input of flip-flop 35 of failure analyzer 9. Flip-flop 35 is identical to flip-flop 25.

Switching board 4 is a plate of insulation material carrying rows of jacks 15, 18, 28, 36 and 37. The purpose of rows 15, 18 and 28 has been described above, jacks 36 are connected with the inputs of computer elements checked (not shown in the drawing), jacks 37 with the outputs of elements checked (also not shown in the drawing). Connections among the jacks are made by means of conductors terminated with plugs (not shown in the drawing).

Figure 4:
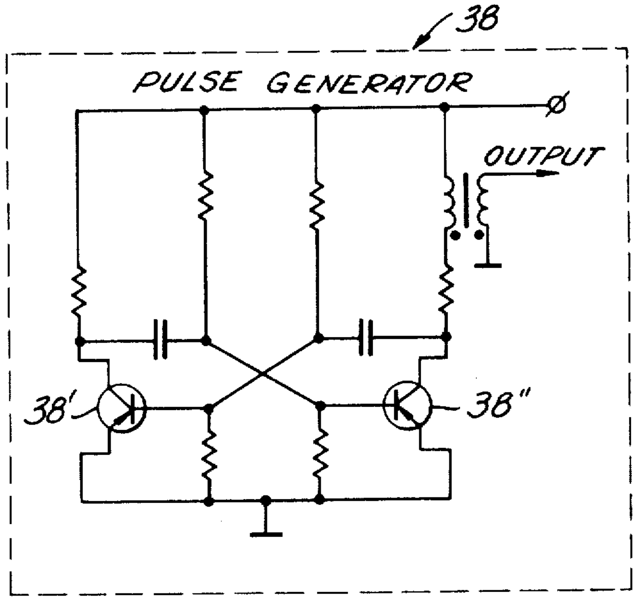
FIG. 4 shows a circuit diagram of the pulse generator used in the device according to the invention.

Synchronizer 6 of unit 5 controlling matrices 1, 2 and 3 is intended to produce signals synchronizing the operation of matrix 1, counter 7 and failure analyzer 9. It consists of pulse generator 38 composed of transistors 38' and 38'' (FIG. 4) as a symmetric multivibrator circuit, of diode-transformer gate 39 identical to the gates of operating signal matrix 2, input 39' of which is coupled with the output of said pulse generator 38, and of pulse amplifiers 40 and 41 identical to amplifiers 10 of interrogation matrix 1; the input of amplifier 40 is connected to the output of gate 39, and the output to the input of counter 7, to the zero inputs of flip-flops 25 and 35 of failure analyzer 9 and via delay line 42 and gate 43, identical to the gates of matrix 2, to the input of said pulse amplifier 41. The output of amplifier 41 is linked with interconnected inputs 14 of the gates of interrogation matrix 1.

Binary counter 7 of control unit 5 is intended for shaping and storing codes of numbers of computer elements checked and consists of *p* digits 44 using flip-flops identical to flip-flop 25 of failure analyzer 9. Counter 7 controls decoder 8.

Decoder 8 of control unit 5 is intended to select identical channels of matrices 1, 2 and 3 according to a code stored in counter 7. It is made as a conventional binary decoder composed of low-potential diode logic coincidence elements 45. The output of each coincidence element 45 is connected to the input of inverting amplifier 46 fitted with transistors 47, 48. The combination of said coincidence element 45 and inverting amplifier 46 makes up potential cell 49. The outputs of potential cells 49 are outputs of decoder 8. The number of the outputs of decoder 8 equals the number of channels in matrices 1, 2 and 3, i.e., $m=2^p$. The outputs of decoder 8 are connected to inputs 13 of the gates of interrogation matrix 1, to inputs 16 of the gates of operating signal registration matrix 2, to inputs 26 of noise signal registration matrix 3, as well as to the visual display unit (not shown in the drawing) which provides an image in a decimal form of a binary code of the number of a computer element checked stored in counter 7.

Failure analyzer 9 of control unit 5 is designed to generate a signal to interrupt the check process when trouble in a computer element checked is detected, and consists of flip-flops 25 and 35 and of potential cell 50 identical to said cell 49. The zero output of flip-flop 25 and the unit output of flip-flop 35 are connected to the inputs of potential cell 50, the output of which is connected to input 51 of gate 39 of synchronizer 6.

Troubles are automatically detected in computer logic units with the aid of the present device in the following manner. Through the use of coupling conductors on switching board 4 a program is composed to check the correctness of operation of computer logic unit elements, the program being made up of three parts: a program for starting elements checked, a program for receiving response operating signals, and a program for receiving noise signals. The program for starting elements checked determines a sequence of their triggering by signals of interrogation matrix 1 and is composed by connecting jacks 15 of switching board 4 with corresponding jacks 36. The program for receiving response operating signals determines a sequence of reception of response signals arriving from elements checked, and is composed by connecting jacks 18 of switching board 4 corresponding jacks 37. The program for receiving noise signals determines a sequence of reception of noise signals arriving from elements checked, and is composed by connecting jacks 28 of switching board 4 with corresponding jacks 37.

After the check program has been composed by means of a manual control panel (not shown in the drawing) counter 7 and flip-flops 25 and 35 of failure analyzer 9 are set to initial (zero) position. Decoder 8 at its output corresponding to code "000—00 in counter 7 produces an enabling voltage level which unblocks the gates (connected to this output) of matrices 1, 2 and 3, and potential cell 50 generates an inhibit voltage level which blocks gate 39 of synchronizer 6, due to which pulses generated by pulse generator 38 fail to pass to the input of amplifier 40. Then the device is started with the help of the manual control panel; now a start pulse is produced which arrives from the control panel at input 52 of gate 52' which is a diode-transformer gate identical to the gates of matrix 2. Gate 52' is unblocked all the time, since its second input is grounded. Owing to this, the start pulse passes through gate 52' and arrives at the input of amplifier 41 of synchronizer 6. From the output of amplifier 41 the pulse is fed to inputs 14 of the gates of interrogation matrix 1, but it passes only through that gate which has been unblocked by the enabling voltage level arriving from a corresponding output of decoder 8. Having passed through this gate to the input of corresponding amplifier 10 of matrix 1 and, further on, from the output of amplifier 10 to the corresponding jack 15 of switching board 4 the pulse, through a coupling conductor, in accordance with the triggering program of elements checked, arrives at that jack of board 4 to which which the input of a preselected checked element is connected. The response operating signal from this element is fed to one of jacks 37 of board 4 and, through the coupling conductor, according to the program for reception of response operating signals to jack 18 of board 4, the jack being connected to input 17 of a corresponding gate (of operating signal registration matrix 2) unblocked by the enabling voltage level arriving from a corresponding output of decoder 8. Having passed through this gate, the response operating signal reaches the input of threshold amplifier 20. Two cases are possible here. If the amplitude of the response operating signal equals or exceeds the value of the operation threshold of amplifier 20 (i.e., a checked element is sound), this amplifier will produce a signal passing through one of permanently unblocked gates 22 to the input of amplifier 23 and, further on, to the unit input of flip-flop 25 of failure analyzer 9. Should the amplitude of the response operating signal be lower than the value of the operation threshold of amplifier 20, there will be no signal at the amplifier output. Thus, in the first case flip-flop 25 will be set to state 1, and in the second case it will remain in the initial (zero) state.

Simultaneously with registration and measurement of a value of the response operating signal arriving from a computer preselected checked element the device effects the registration and measurement of a noise signal value at the output of the other element checked. The noise signal from this element arrives at one of jacks 37 of switching board 4 and, via a coupling conductor, according to the program for reception of noise signals at jack 28 of board 4, the jack being connected with input 27 of one of the gates of noise signal registration matrix 3, unblocked by the enabling voltage level coming from a corresponding output of decoder 8. Having passed through this gate, the noise signal reaches the input of threshold amplifier 30. Two cases are possible here. If the noise signal amplitude equals or exceeds the value of the operation threshold of amplifier 30, this amplifier will produce a signal passing through one of permanently unblocked gates 32 to the input of amplifier 33, and, further on, to the unit input of flip-flop 35 of failure analyzer 9. Should the amplitude of the noise signal be lower than the value of the operation threshold of amplifier 30, there will be no signal at its output. Thus, in the first case flip-flop 35 will be set to state 1, and in the second case it will remain in the initial (zero) state.

The states of flip-flops 25 and 35 are analyzed by means of potential cell 50 which produces the enabling or inhibit voltage level in accordance with the following table:

| Value Uo.s | Value Un.s | States of flip-flops 25 | States of flip-flops 35 | Voltage level at output of cell 50 |
|---|---|---|---|---|
| Uo.s≥Q | Un.s<Q′ | "1" | "0" | Enabling. |
| Uo.s≥Q | Un.s≥Q′ | "1" | "1" | Inhibit. |
| O≤Uo.s<Q | Un.s<Q′ | "0" | "0" | Do. |
| O≤Uo.s<Q | Un.s≥Q′ | "0" | "1" | Do. |

The following symbolism is used in the table:
$U_{o.s.}$ amplitude of response operating signal;
$U_{n.s.}$—amplitude of noise signal;
$Q$— —value of operation threshold of amplifier 20; and
$Q'$—value of operation threshold of amplifier 30.

As can be seen from the table, potential cell 50 produces the voltage enabling level only if one of the elements checked of a computer logic unit is sound, and the value of noise at the output of the other element checked does not exceed the permissible one. In this case the voltage output level of cell 50 unblocks gate 39 of synchronizer 6 which passes a pulse of pulse generator 38 to the input of amplifier 40. From the output of this amplifier the pulse arrives at the zero inputs of flip-flops 25 and 35 setting these flip-flops to the zero state, thereby enabling potential cell 50 to produce the voltage inhibit level (see the table) which blocks gate 39. This is necessary to prevent the next pulse of generator 38 from passing to the input of amplifier 40.

Simultaneously with setting flip-flops 25 and 35 to the zero state, the pulse from the output of amplifier 40 arrives at the input of counter 7 which now alters its counting state and forms the next ordinal number of elements checked. Moreover, this pulse from the output of amplifier 40 reaches the input of delay line 42. The new number code of elements checked, formed by counter 7, is decoded by decoder 8 which unblocks the gates of matrices 1, 2 and 3 corresponding to this code. Then the pulse from the output of delay line 42 through permanently unblocked gate 43 (input 43′ of gate 43 being grounded) passes to the input of amplifier 41. Amplifier 41 will now produce a signal arriving at inputs 14 of the gates of interrogation matrix 1. The described cycle of the device operation is repeated and the computer logic unit elements, preselected by the check program, are checked for correctness of operation. In all other cases (see the table) potential cell 50 produces the voltage inhibit level blocking gate 39 of synchronizer 6, thereby preventing the pulse of generator 38 from passing to the input of amplifier 40 and eliminating the signal at the output of this amplifier. As a result of this, the input of counter 7 will have no signal altering its counting state; moreover, there will be no signal at the output of amplifier 41. Consequently, the operation process of the device is interrupted, and counter 7 will retain the previously formed binary code of the number of the computer element in which trouble has been detected. This code is transformed by the display unit (not shown in the drawing) controlled by voltage levels arriving from outputs 53 of decoder 8, to a form convenient for perception by the operator.

We claim:

1. A programmed device for detecting faults in digital computers, comprising: an interrogation matrix for producing signals activating the computer elements preselected to be checked; an operating signal registration matrix for receiving and measuring the value of the operating signals arriving from each preselected computer element checked after the latter is activated by the signal of said interrogation matrix; a noise signal registration matrix adapted to receive and measure the value of the noise signals arriving from each preselected computer element checked; a switching board for composing the checking program and for maintaining connection between the inputs and outputs of the computer elements checked and said interrogation matrix, operating signal registration matrix and noise signal registration matrix; a control means which controls said matrices used to produce signals insuring in-step operation of said matrices and of the computer elements checked, to form and store the numbers of the computer elements preselected to be checked, to interrupt the checking cycle when the computer element or module checked is found to be out of order and to indicate the number of the faulty computer element or module; said control means being connected with said interrogation matrix, operating signal registration matrix and noise signal registration matrix.

2. A programmed device as claimed in claim 1, comprising a decoder of said control means, said decoder controlling said interrogation matrix; a binary counter of said control means, said binary counter controlling said decoder; said interrogation matrix including coincidence elements and amplifiers, the number thereof being described as $m=2^p$, where $m$ is the number of outputs of said decoder and $p=1, 2, 3...$ is the number of digits of said binary counter.

3. A programmed device as claimed in claim 1, comprising a decoder of said control means, said decoder controlling said operating signal registration matrix; a binary counter of said control means, said binary counter controlling said decoder; said operating signal registration matrix including coincidence elements, OR elements and amplifiers, the number of said coincidence elements being described as $m=2^p$, where $m$ is the number of outputs of said decoder and $= 1, 2, 3...$ —is the number of digits of said binary counter; said amplifiers of the operating signal registration matrix having an operation threshold equal to the optimal voltage ampliti amplitude of the operating signals arriving from the compute elements checked.

4. A programmed device as claimed in claim 1, comprising a decoder of said control means, said decoder controlling said noise registration matrix; a binary counter of said control means for controlling said decoder; said noise signal registration matrix including coincidence elements, OR elements and amplifiers; the number of the coincidence elements of the noise signal registration matrix being described as $m=2^p$, where $m$ is the number of outputs of said decoder and $p=1, 2, 3...$ is the number of digits of said binary counter; said amplifiers of the noise signal registration matrix having an operation threshold equal to the maximum permissible value of the voltage amplitude of the noise signals arriving from the computer elements checked.